(12) United States Patent
Tsai

(10) Patent No.: US 12,234,880 B2
(45) Date of Patent: Feb. 25, 2025

(54) CUSHIONING AIRBAG DEVICE

(71) Applicant: Dongguan Jiashuan Industrial Co., Ltd., Guangdong (CN)

(72) Inventor: Peilin Tsai, Taiwan (CN)

(73) Assignee: Dongguan Jiashuan Industrial Co., Ltd., Guangdong (CN)

( * ) Notice: Subject to any disclaimer, the term of this patent is extended or adjusted under 35 U.S.C. 154(b) by 0 days.

(21) Appl. No.: 18/661,050

(22) Filed: May 10, 2024

(65) Prior Publication Data

US 2024/0369121 A1 Nov. 7, 2024

Related U.S. Application Data

(63) Continuation of application No. PCT/CN2022/083133, filed on Mar. 25, 2022.

(30) Foreign Application Priority Data

Nov. 11, 2021 (CN) ............... 202111331587.0
Nov. 11, 2021 (CN) ............... 202122753793.2

(51) Int. Cl.
*F16F 9/04* (2006.01)
*F16F 9/34* (2006.01)
*A43B 17/03* (2006.01)

(52) U.S. Cl.
CPC ............ *F16F 9/049* (2013.01); *F16F 9/34* (2013.01); *A43B 17/035* (2013.01); *F16F 2222/126* (2013.01)

(58) Field of Classification Search
CPC ........ F16F 9/049; F16F 9/34; F16F 2222/126; A43B 17/035

USPC .................................. 36/28, 29, 44
See application file for complete search history.

(56) References Cited

U.S. PATENT DOCUMENTS

| 5,556,258 A | 9/1996 | Lange et al. | |
| 11,636,041 B2* | 4/2023 | Nayak | G06F 12/10 711/202 |
| 2005/0125905 A1* | 6/2005 | Wilkinson | A61G 7/05776 5/709 |
| 2024/0102571 A1* | 3/2024 | Ding | F04B 33/00 |

FOREIGN PATENT DOCUMENTS

| CN | 201480736 U | 5/2010 | |
| CN | 206830420 U | 1/2018 | |
| CN | 210344415 U * | 4/2020 | F16K 15/20 |

(Continued)

*Primary Examiner* — Christopher P Schwartz
(74) *Attorney, Agent, or Firm* — ScienBiziP, P.C.

(57) ABSTRACT

The present disclosure provides a one-way air inlet valve for a cushioning airbag device and the cushioning airbag device. The one-way air inlet valve includes an air outlet member being in air communication with the at least one airbag; an air inlet member clamped into the air outlet member and being in air communication with the air outlet member; and a block movably arranged between the air outlet member and the air inlet member, the block comprising an engagement surface. Wherein the one-way air inlet performs one-way intake by a movement of the block, and when the block moves to the one of the air outlet member and the air inlet member, the engagement surface of the block tightly abuts against an inner surface of the one of the air outlet member and the air inlet member.

19 Claims, 14 Drawing Sheets

(56) References Cited

FOREIGN PATENT DOCUMENTS

| CN | 211582349 U | | 9/2020 | |
|---|---|---|---|---|
| CN | 111878353 A | * | 11/2020 | ............ F04B 33/00 |
| CN | 112220653 A | * | 1/2021 | .......... A47C 27/082 |
| CN | 212368732 U | | 1/2021 | |
| CN | 112576565 A | | 3/2021 | |
| CN | 113712341 A | | 11/2021 | |
| CN | 114041942 A | | 2/2022 | |
| JP | 3223056 U | | 9/2019 | |
| JP | 2020152100 A | * | 9/2020 | ............ A43B 17/03 |
| TW | M254938 U | | 1/2005 | |
| TW | M531761 U | | 11/2016 | |

* cited by examiner

CUSHIONING AIRBAG DEVICE

This application claims the benefit of priority to Chinese Patent Application Number 202111331587.0 filed on Nov. 11, 2021, and entitled "CUSHIONING AIRBAG PAD", and Chinese Patent Application Number 202122753793.2, and entitled "CUSHIONING AIRBAG PAD", in the China National Intellectual Property Administration. The entire contents of the above-identified application are hereby incorporated by reference.

TECHNICAL FIELD

The present disclosure relates to the technical field of domestic utensils, and in particular relates to a cushioning airbag device.

BACKGROUND

In daily life, shoulder strap backpacks, waist bags, shoulder bags, arm bags, and other bag products are often used in households, automobiles, medical purposes, sport activities. The traditional bag products often only focus on the functionality such as loading capacities. In the process of designing or purchasing backpacks, much attention is placed on the number of bags in the backpacks, how much it can hold, or whether it looks good, but little attention is place on the comfort of users when using the backpacks. When the backpack is being used, weight is generally concentrated on the shoulders, waist, neck or arms of the user. However, during use, motions will produce slight vibrations, and the straps of the backpack will produce impact and friction on the contact parts. Especially when people exercise vigorously, the above-described collision force and friction force will produce quite powerful negative effects. When the backpack carries a heavy load or when the user has been carrying the backpack for a long time, local blood circulation of the user may not be smooth due to long-term pressure in these parts, thereby causing pain. In addition, the contact areas may become tightly sealed, thereby making the use to sweat and unable to effectively dissipate heat, causing great discomfort and may even affect skin health, increasing higher health risks to the user. Therefore, airbag cushions with cushioning effects are very popular. This type of airbag cushions includes a plurality of interconnected airbags, which need to be inflated by an inflation pump. However, each time the airbag cushions are inflated, an additional inflation pump is required to inflate the airbags. If there is a leak in the cushion body outdoors, the lack of an inflation pump makes it difficult to inflate the cushion body, resulting in inconvenient during inflation.

SUMMARY

To solve the above problems, the present disclosure provides a convenient cushioning airbag device.

To achieve the above objectives, the technical solution of the present disclosure is as follows.

A cushioning airbag device, comprising a first airbag, a second airbag, and a first airway in communication with the first airbag and the second airbag, wherein the first airbag comprises an intake port communicating with external air, and the cushioning airbag device further comprises an elastic member disposed in the first airbag, and the elastic member configured for supporting the first airbag to bulge so as to intake air into the second airbag by the first airway, when the first airbag is pressed, the elastic member in the first airbag is pressed, the first airbag is in a pressed state, and under the action of a pressure differential, gas inside the first airbag flows into the second airbag through the first airway, thereby inflating the second airbag; and when the first airbag is released, the elastic member supports the first airbag to return to a reset state, and under the action of the pressure differential, the air inlet inhale air external to the cushioning airbag device, thereby supplementing air into the first airbag.

Further, the cushioning airbag device further comprises a one-way air inlet component arranged in the first airbag, the one-way air inlet component is configured to enable air inside the first airbag to be unidirectionally intake into the second airbag.

Further, the cushioning airbag device further comprises a one-way air inlet valve mounted to the air inlet, the one-way air inlet valve enabling external air to enter the first airbag via the one-way air inlet valve and preventing air from escaping from the first airbag to the outside.

Further, the one-way air inlet valve comprises an air inlet member, a ball and a jacking member, the air inlet is mounted to the air inlet and communicates with the first airbag, and the jacking member is clamped into the air inlet, and communicating with the air inlet, the ball is movably mounted between the air inlet and the jacking member, air is introduced unidirectionally by the movement of the balls.

Further, the one-way air inlet valve comprises an air inlet terminal, a block member, a plug and a cover, the air inlet terminal is mounted to the air inlet and is in communication with the first airbag, the block member is arranged in the air inlet terminal, the plug covers a head of the block member, and the cover body blocks the air inlet terminal so as to achieve the effect of sealing.

Further, the cushioning airbag device further comprises a one-way air outlet valve and a third airbag adjacent to and communicating with the first airbag, the third airbag is provided with an air outlet, and the one-way air outlet valve is mounted on the air outlet of the third airbag and configured for discharging air inside the third airbag to environment external to the cushioning airbag device, and preventing external air from entering the third airbag through the one-way gas outlet valve.

Further, the one-way air outlet valve comprises an air inlet terminal, a spring and a plug, the air inlet terminal is arranged the air outlet and is in air communication with the third airbag, the spring is sleeved on the plug, and the plug is movably inserted into the air inlet terminal.

Further, the air outlet valve comprises a seal ring, and the seal ring is sleeved on the plug and located between the gas inlet terminal and the plug, the one-way air outlet valve is configured for preventing external air from flowing into the third airbag and prevent air inside the second airbag from flowing out Further, the elastic member is any one of sponge, plastic colloid, spring, rubber and silica gel.

Compared with the prior art, in the cushioning airbag device designed by the present disclosure, the first airbag and the second airbag can be inflated by an elastic member anytime and anywhere without an additional inflation tool, therefore, the airbag can be inflated by simply pressing the elastic member outdoors, thereby facilitating inflation.

DETAILED DESCRIPTION

In order to further clarify the purpose, technical solution, and advantages of the present disclosure, the following will provide a detailed explanation of the present disclosure in conjunction with the accompanying drawings and embodiments. The specific embodiments described herein are only used to explain the present disclosure and are not intended to limit the present disclosure.

Figure 1:
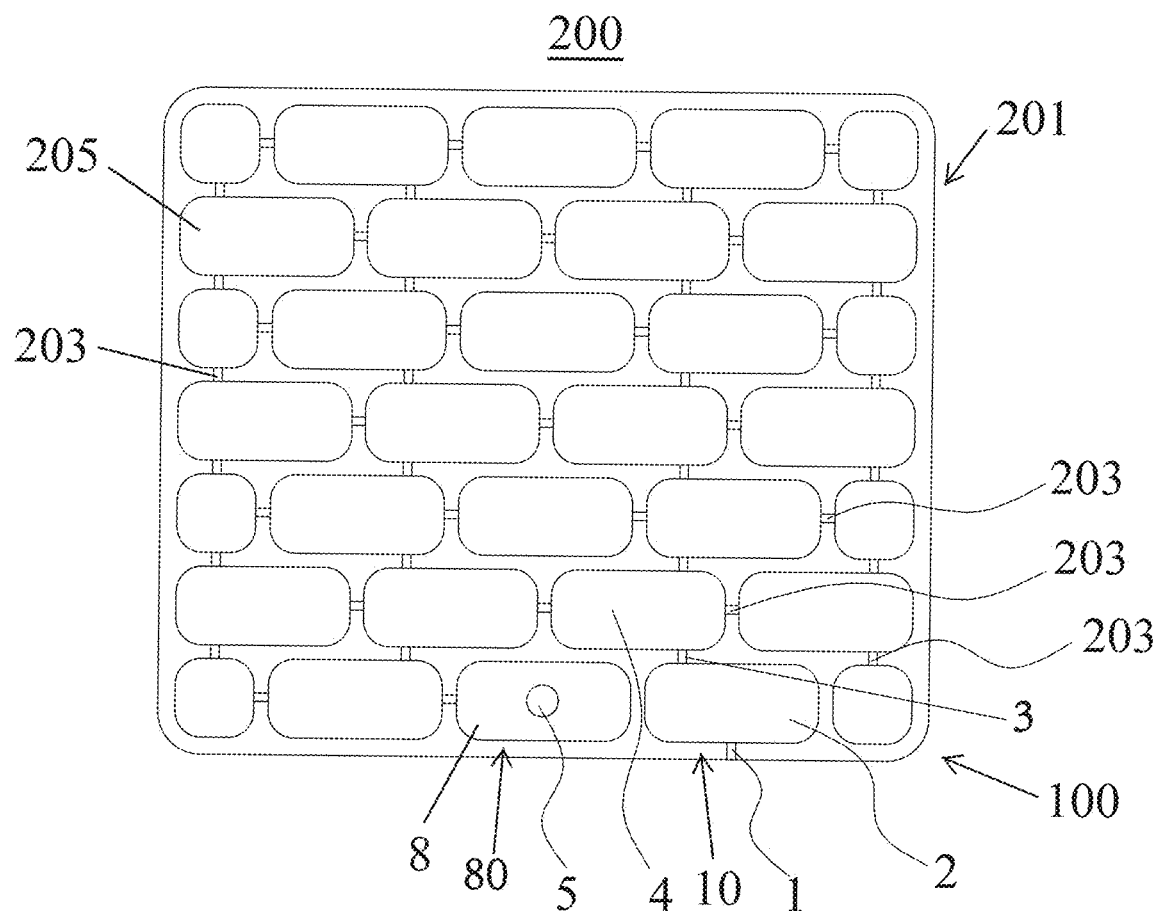
FIG. 1 is a schematic diagram of a seat cushion according to a first embodiment of the present disclosure.
Figure 2:
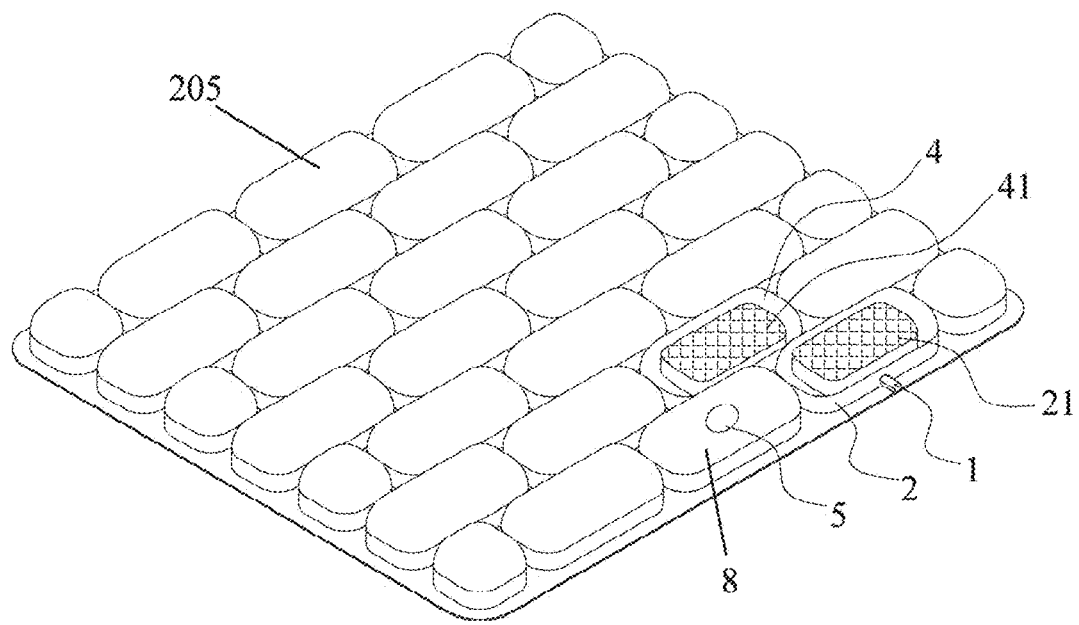
FIG. 2 is a three-dimensional view of the seat cushion shown in FIG. 1.

The cushioning airbag device of the present disclosure is applicable to cushioning airbag devices such as seat cushions, shoulder straps, insoles, etc. The specific description below is as follows. Referring to FIG. 1 and FIG. 2, the FIG. 1 and FIG. 2 show a first embodiment of the present disclosure. The cushioning airbag device 100 is configured for a seat cushion 200 of the buffering airbag devices. The seat cushion 200 includes a cushion body 201 and the cushioning airbag device 100 provided on the cushion body 201.

The cushion body 201 includes a plurality of airbags 205 connected to each other through a plurality of air channels 203, and one airbag 205 of the plurality of airbags 205 is in air communication with the cushioning airbag device 100 through one air channel 203.

The cushioning airbag device 100 includes an air inlet component 10 and a gas outlet component 80, the air inlet component 10 is connected to the plurality of airbags 205 through the plurality of air channels 203. The air inlet component 10 comprises a first airbag 2, a second airbag 4, a third airbag 5 and an elastic member 21.

The first airbag 2 is connected to a one-way air inlet components 6 described later and configured for air intake, one side of the first airbag 2 defines an first air inlet 1, and another side of the first airbag 2 is in air communication with the second airbag 4 by the first airway 3, such that gas flows into the second airbag 4 from the first airbag 2 by the first airway 3, and the first air inlet 1 is in air communication with external air.

The second airbag 4 is in air communication with the plurality of airbags 205 through the plurality of air channels 203. The first airbag 2 is connected in series with the second airbag 4, such that the gas flow is in one direction, so as to achieve buffering and concentrated rapid inflation.

The elastic member 21 is arranged inside the first airbag 2 and configured for supporting the first airbag 2 to bounce and bulge, such that the first airbag 2 is filled with gas, and the gas can enter and be discharged from the first airbag 2. The elastic member 21 can be made of any one of sponge, plastic, spring, rubber and silica gel.

The second airbag 4 may also be provided with an elastic member 41 (see FIG. 2), the elastic member can be installed in the plurality of airbags according to actual needs.

When using the cushioning airbag device 100, it is not necessary for any inflation tool to squeeze or press the first airbag 2. Specifically, when the first airbag 2 is squeezed or pressed, the elastic member 21 inside the first airbag 2 is pressed, and the first airbag 2 is in a pressed state, under the action of the pressure differential, the gas in the first airbag 2 flows into the second airbag 4 through the first airway 3, thereby inflating the second airbag 4. The gas inside the second airbag 4 flows into the plurality of airbags 205 by the plurality of air channels 203, thereby the entire seat cushion 200 is filled with gas. When the squeeze or pression is released, the first airbag 2 is released, and under the elastic reset action of the elastic member 21, the elastic member 21 supports the first airbag 2 to reset, and the elastic member 21 supports the first airbag 2 to return to a reset state, meanwhile, under the action of the pressure differential, the first air inlet 1 can inhale external air to the cushioning airbag device, and the gas is sucked into the first airbag 2 via the first air inlet 1, thereby supplementing air into the first airbag 2.

Compared with the prior art, the cushioning airbag device 100 of the present disclosure can inflate the first airbag 2 and the second airbag 4 by repeatedly pressing the elastic member anytime and anywhere without an additional inflation tool, therefore, the plurality of airbags 205 can be inflated by simply pressing the elastic member 21 outdoors, making inflation more convenient. Additionally, when pressure is encountered, the plurality of airbags 205 of the seat cushion 200 can be squeezed to achieve a cushioning effect.

Figure 3:
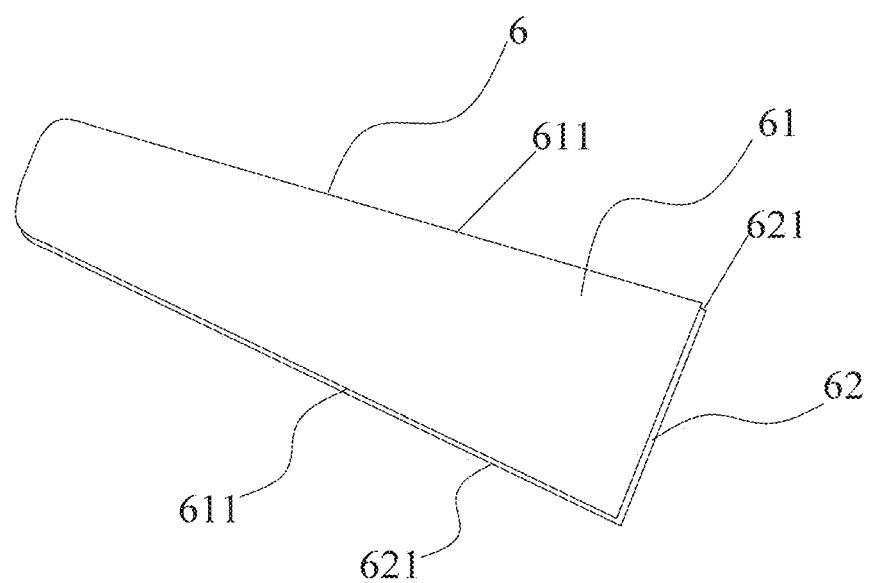
FIG. 3 is a schematic diagram of a one-way air inlet component of the seat cushion shown in FIG. 1.

Further referring to FIG. 3, the cushioning airbag device 100 may further include one-way air inlet components 6, which arranged in the first airbag 2, the second airbag 4 and the first airway 3 respectively, to allow the gas inside the first airbag 2 to be unidirectionally intake into the second airbag 4. Each of the one-way air inlet component 6 includes an upper piece 61 and a lower piece 62. A side edge 611 of the upper piece 61 and a side edge 621 of the lower piece 62 are adhered together by the high frequency voltage of the high-frequency machines, such that the one-way air inlet component 6 is a two-layered structure in which two ends of the upper piece 61 and corresponding two ends of the lower piece 62 not sealed together to form two opening ends, two side edges 611 of the upper piece 61 and corresponding two side edges 621 of the lower piece 62 are sealed together, and the two opening ends of the one-way air inlet component 6 are in air communication with a middle portion of the one-way air inlet component 6. The adhering method between the side edge 611 of the upper piece 61 and the side edge 621 of the lower piece 62 is not limited to be formed by the high frequency voltage, and the side edge 611 of the upper piece 61 and the side edge 621 of the lower piece 62 may also be adhered together by a hot press, and the side edge 611 of the upper piece 61 and the side edge 621 of the lower piece 62 may also be adhered together by hot melt adhesive. The structure of the one-way air inlet component 6 is not limited to the structure formed by adhering the upper piece 61 and the lower piece 62, for example, the integrally molded cylindrical element is pressed into a flat structure to form the one-way air inlet component 6, such that the one-way air inlet component 6 with the flat structure is directly formed into the one-way air inlet component 6 without performing the step of adhering the upper piece 61 and the lower piece 62.

One opening end of the one-way air inlet component 6, namely a first opening end, is attached to an inner wall of the first airbag 2 and the first airway 3 by a high-frequency voltage, and the first opening end of the one-way air inlet component 6 always keep in the opening state. The other opening end of the one-way air inlet component 6, namely a second opening end, and the middle portion of the one-way air inlet component 6 are located inside the second airbag 4.

In first embodiment, the upper piece 61 and the lower piece 62 are both plastic flat pieces, when the upper piece 61 and the lower piece 62 of the middle portion and the second end of the one-way air inlet component 6 contact each other, the upper piece 61 and the lower piece 62 can have the absorbing effect, thus playing a role in sealing the airway. When using the seat cushion 200, the first airbag 2 is squeezed or pressed, the elastic member 21 inside the first airbag 2 is pressed, the gas in the first airbag 2 flows into the middle portion of the one-way air inlet component 6 through the first end of the opened one-way air inlet component 6. At this time, the upper piece 61 and the lower piece 62 of the middle portion of the one-way air inlet component 6, which are in contact with each other, are separated and opened to form a channel under the pressure of the gas. Furthermore, at this time, the second end of the one-way air inlet component 6 is also propped open by the pressure of the gas, such that the gas flows into the second airbag 4 from the channel and the second end of the one-way air inlet component 6. Then, the air flows into the plurality of airbags 205 through the plurality of air channels 203, such that the air fills the whole seat cushion 200. When the squeeze or pression is released, the first airbag 2 is released, under the elastic resetting effect of the elastic member 21, the first airbag 2 is ejected and reset, and at this time, the upper piece 61 and the lower piece 62 at the middle portion and the second end of the one-way air inlet component 6 are in contact with each other, which closes the entrance of the channel. Furthermore, the second end of the one-way air inlet component 6 is also in a closed state, so as to prevent the gas of the second airbag 4 from flowing backwards to the first airbag 2, thereby achieving one-way intake and effectively preventing air leakage.

Figure 19:
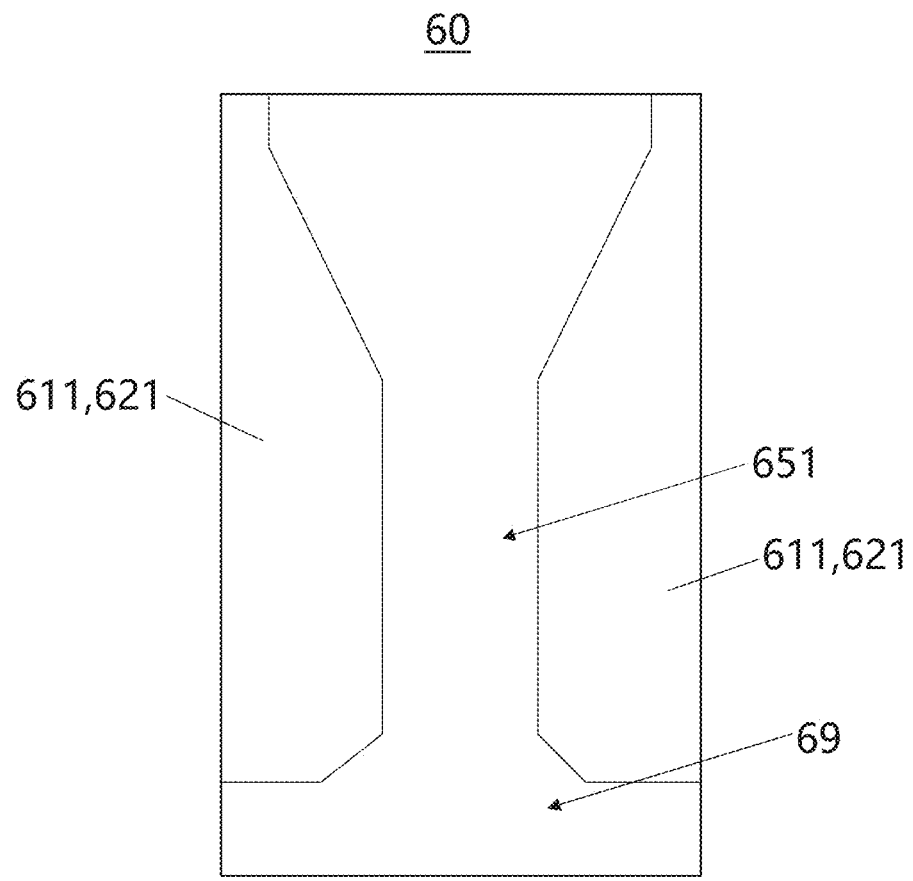
FIG. 19 is a schematic view of another structure of the one-way air inlet component according to the present disclosure.
Figure 20:
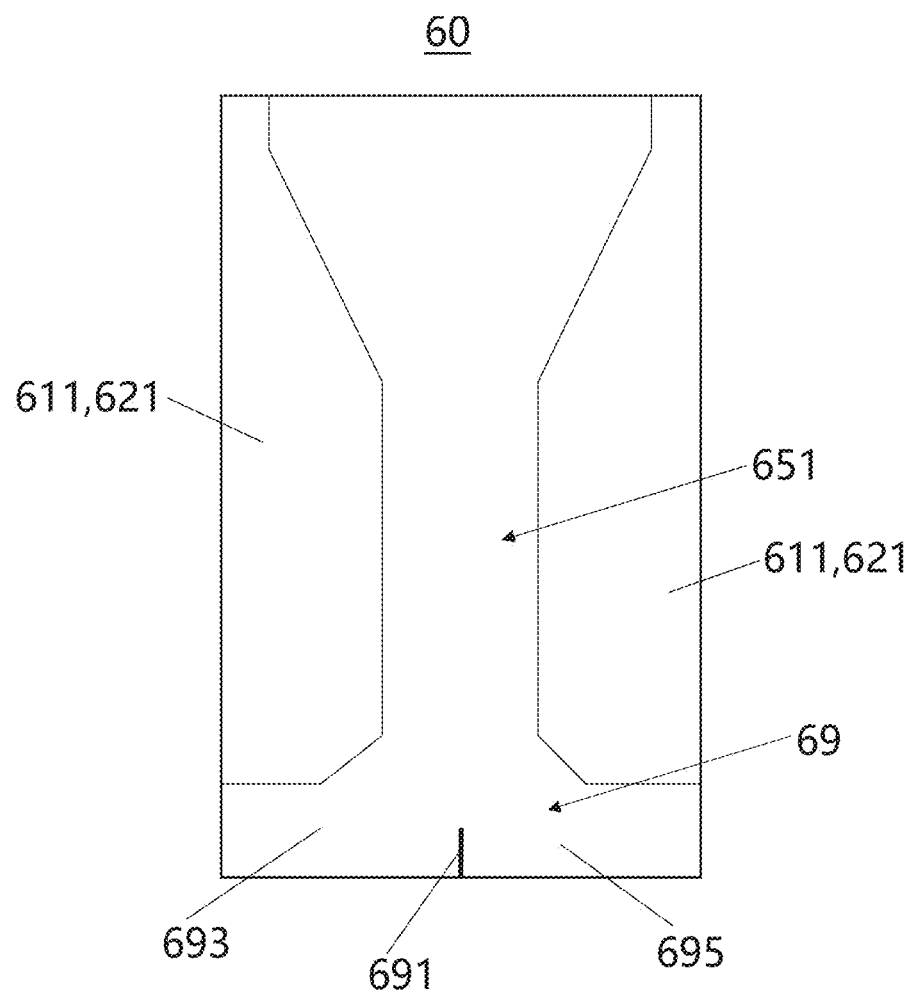
FIG. 20 is a schematic view of yet another structure of the one-way air inlet component according to the present disclosure.

In one-way air inlet component 6 may be a structure of a one-way air inlet component 60 as shown in FIG. 19, which is similar as the structure of the one-way air inlet component 6, the difference is that the one-way air inlet component 60 further includes an anti-leakage portion 69. The anti-leakage portion 69 is connected to one end of an intake airway 651, and is accommodated in the second airbag 4. The side edge 611 of the upper piece 61 and the side edge 621 of the lower piece 62 both at the anti-leakage portion 69 are not attached to each other. When the gas flows into the anti-leakage portion 69 through the intake airway 651, portions of the upper piece 61 and the lower piece 62 are separated from each other, and then after the gas flows into the second airbag 4 through the anti-leakage portion 69, the upper piece 61 and the lower piece 62 at the anti-leakage portion 69 are in contact with each other and are adsorbed together, such that the intake airway 651 is in a closed state. Since the side edge 611 of the upper piece 61 and the side edge 621 of the lower piece 62 at the anti-leakage portion 69 are not adsorbed together, the mutual adsorption area between the upper piece 61 and the lower piece 62 becomes larger, thereby effectively preventing air leakage of the second airbag 4 through the anti-leakage portion 69, and further providing a better air leakage preventing effect for the cushioning airbag device 100.

The one-way air inlet component 6 may be a structure of a one-way air inlet component 60 shown in FIG. 19, which is similar as the structure of the one-way air inlet component 6, the difference is that a fixing portion 691 is arranged at a middle position of a bottom end of the anti-leakage portion 69, and the fixing portion 691 fixes the upper piece 61 and the lower piece 62 at the bottom end of the anti-leakage portion 69. The fixing portion 691 divides the anti-leakage portion 69 into a first anti-leakage portion 693 and a second anti-leakage portion 695. The upper piece 61 and the lower piece 62 at the fixing portion 691 are attached and fixed together by the up and down voltages.

After long-term use, the aging of the upper piece 61 and the lower piece 62 at the anti-leakage portion 69, for example, oil leakage occurred in plastic materials which is used to form the upper piece 61 and the lower piece 62, causes the upper piece 61 and the lower piece 62 to be completely separated and cannot be attracted to each other, thereby resulting in air leakage. In the one-way air inlet component 60 according to the eighth embodiment, even if the upper piece 61 and the lower piece 62 at the anti-leakage portion 69 age, because the fixing portion 691 is provided, the upper piece 61 and the lower piece 62 do not completely separate from each other, thereby effectively preventing a separation phenomenon caused by aging of the upper piece 61 and the lower piece 62, and further ensuring prevention of air leakage.

Figure 4:
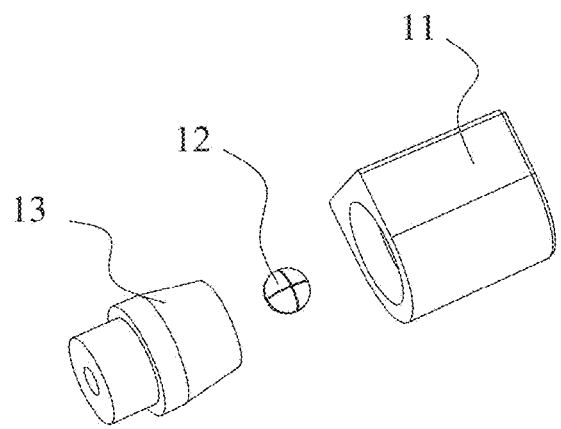
FIG. 4 is an exploded three-dimensional view of an air inlet valve of the seat cushion shown in FIG. 1.
Figure 5:
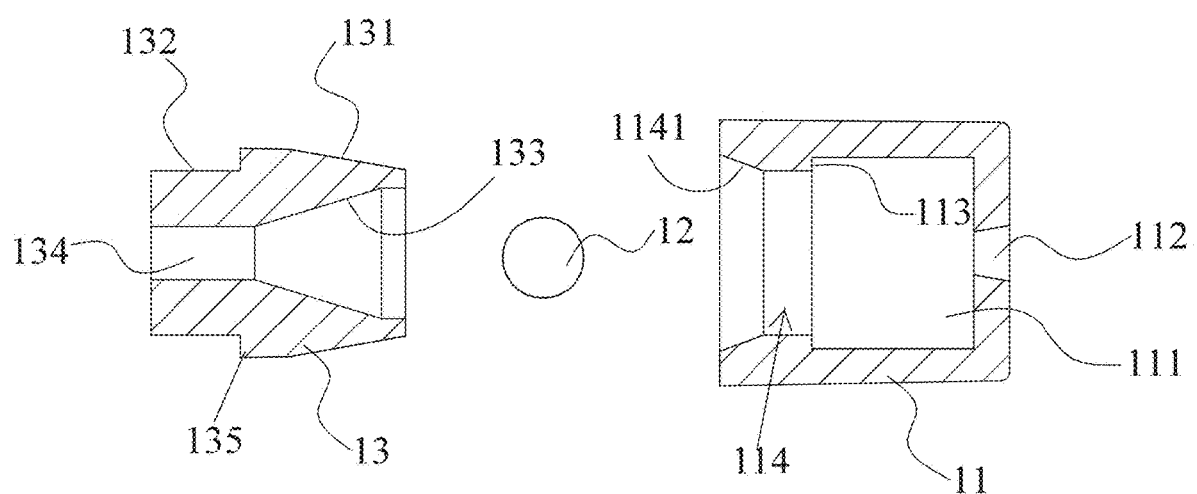
FIG. 5 is an exploded sectional view of the air inlet valve of the seat cushion shown in FIG. 4.
Figure 6:
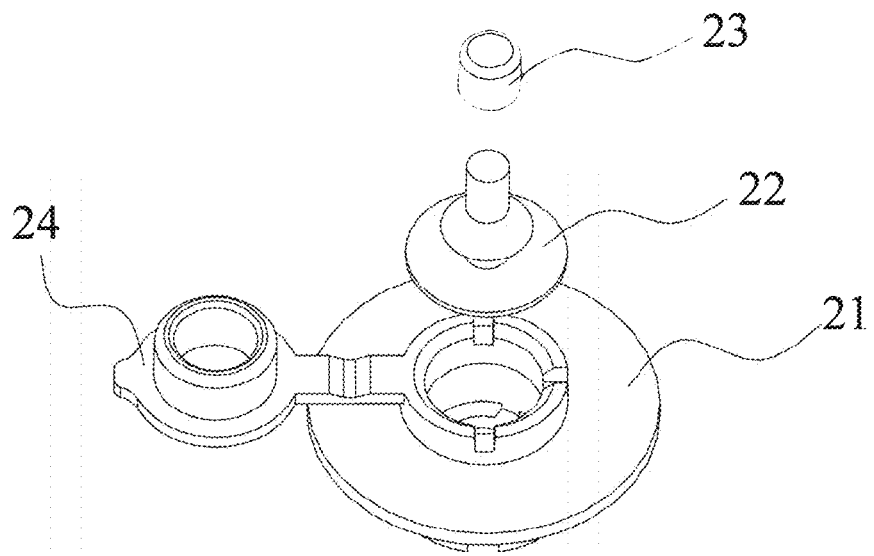
FIG. 6 is an exploded three-dimensional view of another air inlet valve of the seat cushion of the first embodiment of the present disclosure.
Figure 7:
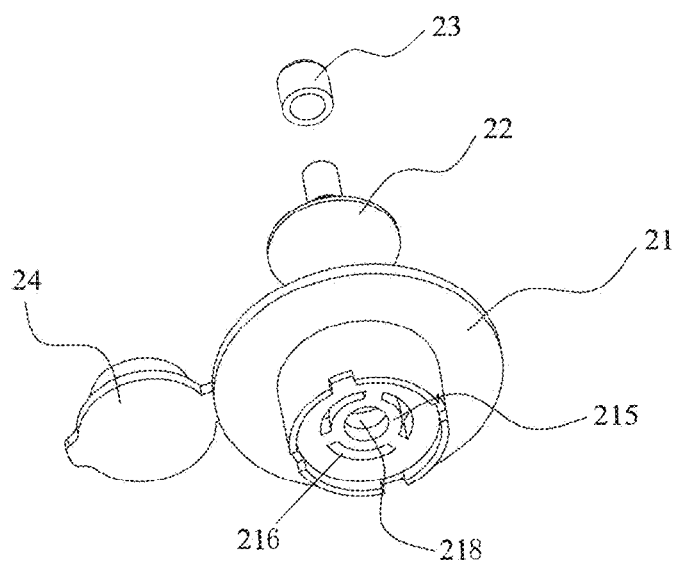
FIG. 7 is an exploded three-dimensional view of another view of the air inlet valve of the seat cushion shown in FIG. 6.
Figure 8:
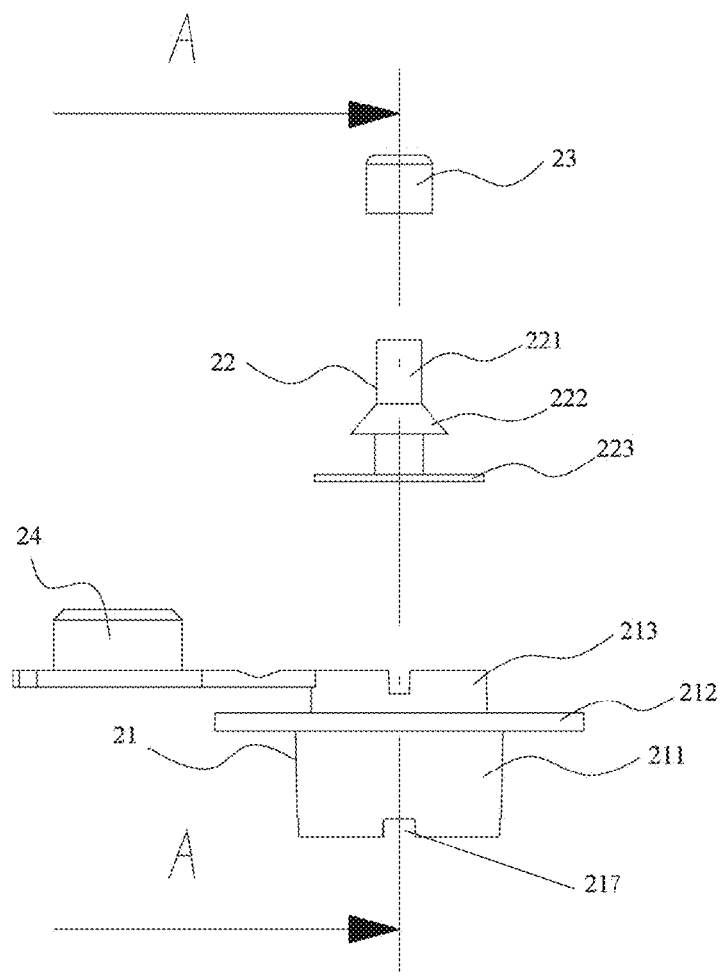
FIG. 8 is a front exploded view of the air inlet valve of the seat cushion shown in FIG. 6.
Figure 9:
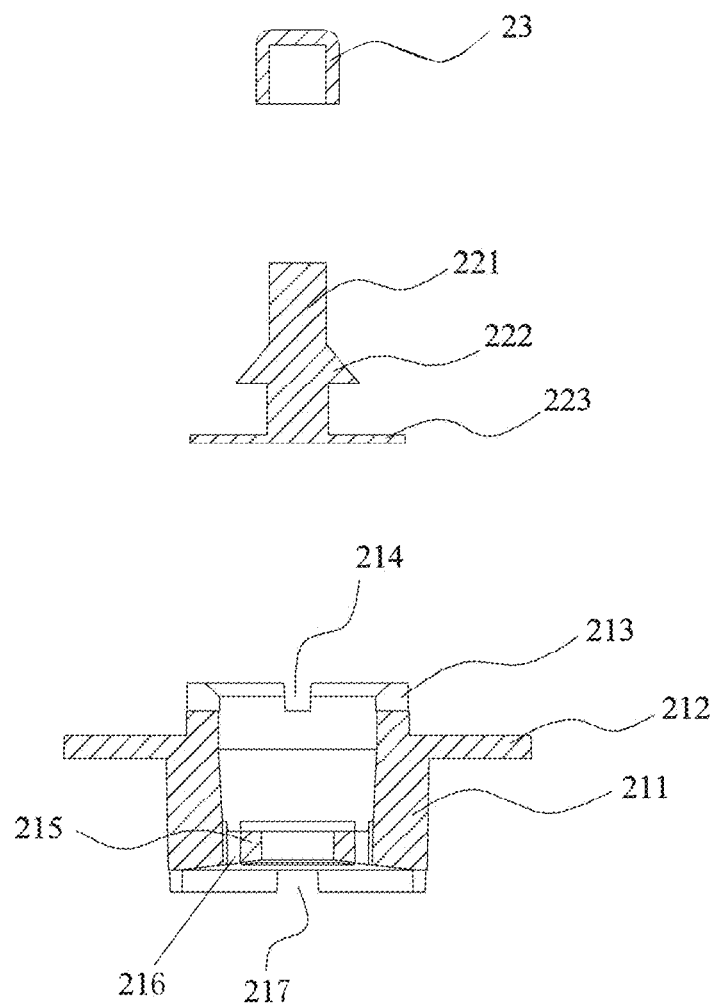
FIG. 9 is a cross-sectional view from an A-A direction shown in FIG. 8.

Referring to FIG. 4 and FIG. 5, the cushioning airbag device 100 further includes an air inlet valve 10 arranged in the first air inlet 1, and the air inlet valve 10 is a one-way air inlet valve, allowing the gas to only enter and not exit from the first air inlet 1.

The air inlet valve 10 includes an air inlet member 11, a block 12 and an jacking member 13. The air inlet member 11 is mounted on the first air inlet 1 and is in air communication with the first airbag 2. The jacking member 13 is clamped in the air inlet member 11 and is in air communication with the air inlet member 11. The block 12 is movably arranged between the air inlet member 11 and the jacking member 13 and the block comprises an engagement surface. The air inlet member 11 includes a cavity 111, one side wall of the cavity 111 is provided with a mounting opening 114, and another side wall of the cavity 111 is provided with an air outlet 112, and the interior of the air inlet member 11 includes an inner edge 113 protruding inward and configured for clamping the jacking member 13. A wall surrounding the mounting opening 114 includes a guiding slope 1141 configured for guiding a portion of the jacking member 13 to slide into the cavity 111 of the air inlet member 11.

The front end of the jacking member 13 is provided with an opening 133 which is funnel-shaped and can accommodate the block 12, the bottom of the opening 133 defines a through hole 134 configured for air intake. In one embodiment, the block 12 is a ball, and the diameter of the bottom of the opening 133 is smaller than the diameter of the block 12, such that the block 12 can roll in the opening 133 and cannot leave the opening 133. The front end 131 of the jacking member 13 has a truncated cone-like structure, and the rear part 132 has a diameter-constricting shape.

The jacking member 13 is sheathed in the cavity 111 of the air inlet member 11, and the inner edge 113 is precisely clamped with the outer edge 135 of the diameter reducing portion such that the front end 131 is clamped in the cavity 111, such that when air flows into, air flows into from the through hole 134, passes through the opening 133 and the cavity 111, and flows into the first airbag 2 through the air outlet hole 112. However, when the gas flows out from the opening 133 under the action of the pressure, the ball 12 may be caught in the opening 133 to close the opening 133, such that the gas cannot flow out from the opening 133 through the through hole 134, thereby forming a unidirectional flow effect.

The one-way air inlet valve closes the air inlet and air outlet by the block 12 and performs one-way intake by a movement of the block 12, and when the block 12 moves to the one of the air inlet member 11 and the jacking member 13, the engagement surface of the block 12 tightly abuts against an inner surface of the one of the air inlet member 11 or an inner surface of the jacking member 13. The air inlet member 11 configured for receiving the block 12 includes a bell mouth, the through hole 134 is circular, and the air outlet 112 is in a linear shape, such that the blocks 12 are blocked at one side and are not blocked at another side. Therefore, when the airbag is pressed, air can only be introduced and cannot be exhausted.

The air inlet valve 10 may be a other structure of air inlet valves 20, for example, as shown in FIG. 6-FIG. 9, the air inlet valve 20 includes an air inlet terminal 21, a block member 22, a plug 23 and a cover 24, and the structure of the air inlet valve 20 can not only realize one-way air intake, but also control the air intake and discharge, and can be used according to actual needs.

Specifically, the air inlet terminal 21 is mounted on the first air inlet 1 and is in air communication with the first airbag 2, the block member 22 is arranged in the air inlet terminal 21, the plug 23 covers the head 221 of the clamping member 21, and the cover 24 blocks the air inlet terminal 21, so as to achieve the sealing effect. The air inlet terminal 21 includes an air inlet portion 211, a bearing platform 212 and an air outlet portion 213, the cover 24 is connected to one side of the air outlet portion 213.

The block member 22 is arranged in the air inlet terminal 21, and includes a head 221, a blocking portion 222 and an end portion 223. The blocking portion 222 is located below the head 221 and is in a conical platform shape which gradually expands from top to bottom. The end portion 223 is located below the blocking portion 222. The block member 22 is in an inverted T-shaped structure. The head 221, the blocking portion 222 and the end portion 223 are integrally formed.

The plug 23 covers the head 221 which provides protection for the head 221 and increases the area of the head 221 for easy pressing.

An outer end of the air inlet portion 211 of the air inlet terminal 21 defines a second air inlet 214, a plurality of air outlets 216 and one insertion hole 218 are defined at the bottom portion 215, and the plurality of air outlets 216 are arranged around the circumference of the insertion hole 218. The block member 22 is capable of inserting into the air inlet portion 211 via the insertion hole 218, and after the block member 22 inserts into the air inlet portion 211, the end portion 223 is located below the bottom portion 215 so as to be able to block the plurality of air outlets 216, and the block member 22 is located above the bottom portion 215, and thus the flow of gas can be controlled via the block member 22. An exhaust groove 217 is defined at the periphery of the bottom of the inlet terminal 21 away from the bearing platform 212.

The blocking portion 222 is sheathed on the bottom portion 215, such that the bottom portion 215 supports the blocking portion 22 (the end portion 223 is located below the bottom portion 215, and the head 221 is located above the bottom portion 215), and under the action of the bottom portion 215, the air intake and the air exhaust are controlled by the block member 22.

Generally, the block member 22 is flexible, the plug 23 is rigid, and the plug 23 is sleeved on the head 221 so as to be easily pressed by hand.

When entering the gas, aligning an air inflation cylinder with the second air inlet 214, and the air inflation cylinder abutting against the block member 22, thereby pushing the bottom portion 215, such that the plurality of air outlets 216 are opened, thereby inflating, and after inflation is completed, blocking the second air inlet 214 by the cover 24 to achieve a sealing effect.

When releasing the gas, the cover 24 opens firstly, the plug 23 and pushing the plug 23 are pressed downwards to push the block member 22, thereby opening the plurality of air outlets 216 for deflating. The intake valve not only can achieve the effect of intake but also has the effect of deflation.

Figure 10:
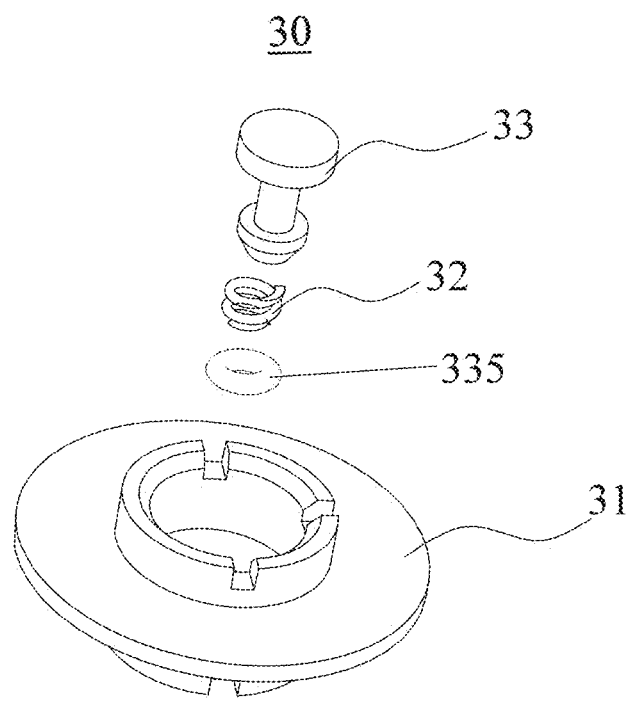
FIG. 10 is an exploded three-dimensional view of an air outlet valve of the seat cushion according to the first embodiment of the present disclosure.
Figure 11:
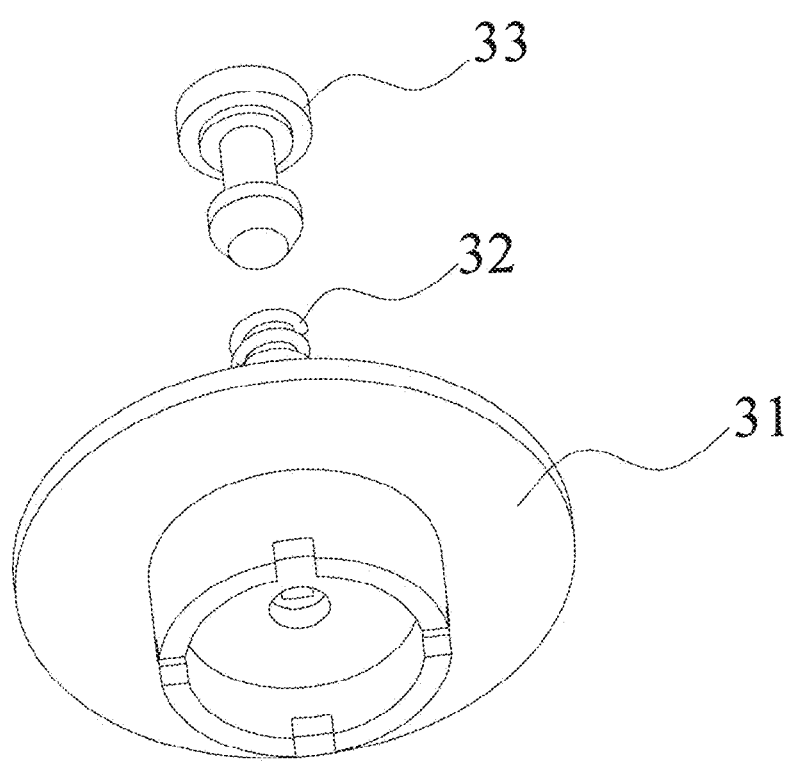
FIG. 11 is an exploded three-dimensional view of another view of the air outlet valve shown in FIG. 9.
Figure 12:
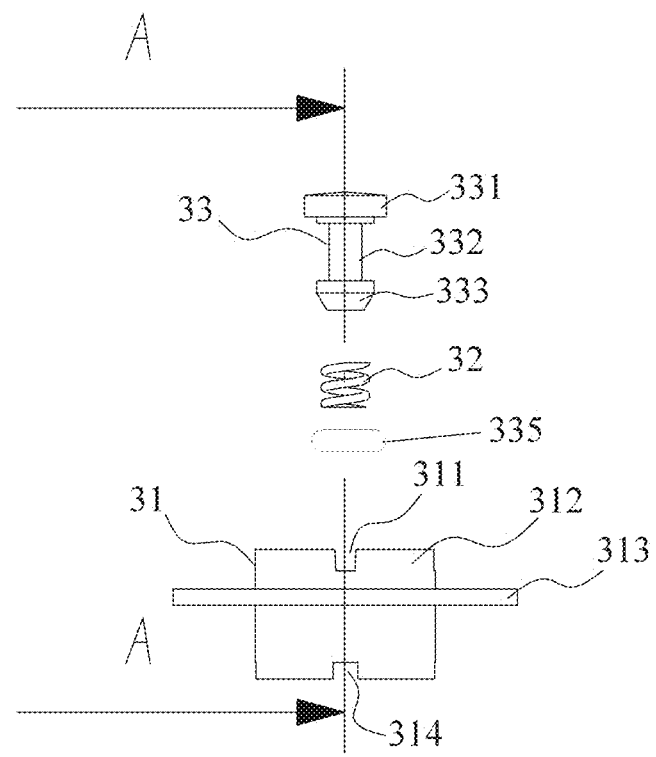
FIG. 12 is a front exploded view of the air outlet valve of the seat cushion shown in FIG. 9.
Figure 13:
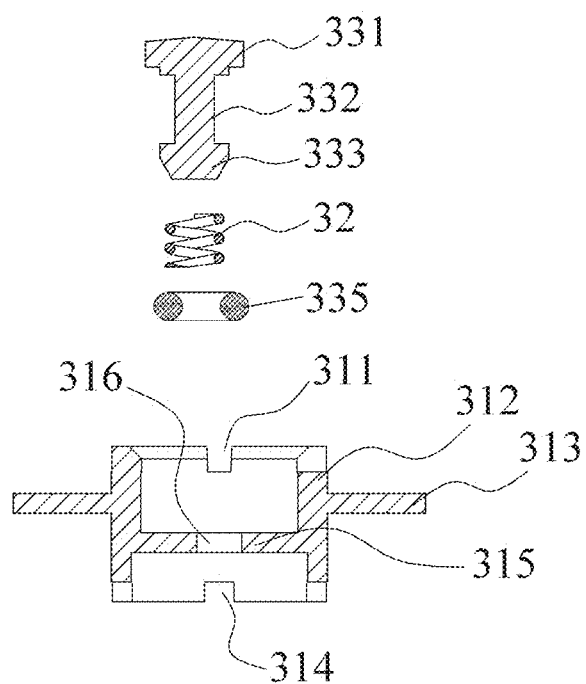
FIG. 13 is a cross-sectional view from the A-A direction shown in FIG. 8 and FIG. 12.

Referring to FIG. 1 and FIG. 2, the air outlet component 80 includes a third airbag 8 and an air outlet valve 30 (refer to FIG. 10). The third airbag 8 is in air communication with one airbag 205 of the cushion body 201 via the gas channels 203, and the third airbag 8 includes an air outlet 5 configured for exhausting the gas inside the cushion 200. In the present disclosure, the third airbag 8 is a terminal airbag, and is in air communicated with the first airbag 2, such that a plurality of airbag structures of the whole seat cushion 200 are compactly arranged, thereby achieving a buffering effect. The position of the third airbag 8 can be set according to actual requirements, and the described one-way air inlet component 6 can also be used as an air outlet 5 and used as an air outlet channel.

Referring to FIGS. 10-13, the cushioning airbag device 100 can further include an air outlet valve 30. In some embodiments, the air outlet valve 30 is arranged on the air outlet 5 of the third airbag 8, and is a one-way air outlet valve, and such that the air can only be discharged from the air outlet and cannot be inlet, thereby ensuring that the air is unidirectionally discharged.

The air outlet valve 30 includes an air inlet terminal 31, a spring 32 and a plug 33. The embodiment can achieve deflation, and the air outlet valve 30 can be arranged according to actual needs.

The inlet terminal 31 is arranged at the air outlet 5 and is in air communication with the third airbag 8, the spring 32 is sleeved on the plug 33, and the plug 33 is movably inserted into the inlet terminal 31. The air inlet terminal 31 includes an air inlet portion 311, a bearing platform 312, a protruding protrusion 313 and a gas outlet portion 314, a main body of the bearing platform 312 is of a hollow cylindrical structure, the middle portion of the bearing platform 312 is provided with a protruding protrusion 313, the protruding protrusion 313 facilitates the arrangement and fixation of the one-way air inlet valve, the upper end of the bearing platform 312 includes the air inlet portion 311, and the lower end of the bearing platform 312 includes the gas outlet portion 314.

The middle position inside the bearing platform 312 includes a clamp portion 315 that extends inward, which is configured for supporting the plug 33.

One end of the plug 33 includes a protruding portion 331, a diameter reducing portion 332 is arranged below the protruding portion 331, and a bottom portion 333 is arranged below the diameter reducing portion 332, the diameter of the diameter reducing portion 332 is smaller than the diameter of the protruding portion 331 and the bottom portion 333. A seal ring 335 is arranged at the diameter reducing portion 332 of the plug 33 and located between the diameter reducing portion 332 of the plug 33 and the clamp portion 315 of the inlet terminal 31, and is configured for preventing external air from flowing into the third airbag 8 and preventing air inside the third airbag 8 flowing out, thereby further ensuring the sealing performance.

The spring 32 is fitted over the diameter reducing portion 332.

During installation, firstly, the spring 32 is sheathed in the diameter reducing portion 332, and then the bottom portion 333 of the plug 33 passes through the hole 316 in the middle of the clamp portion 315 of the air inlet terminal 31, such that the spring 32 is located between the clamp portion 315 and the protruding portion 331.

During deflation, the protruding portion 331 of the bottom plug 33 is pressed, the protruding portion 331 pushes the spring 32 downwards, at the same time, the bottom portion 333 also moves downwards, thereby opening the hole 316, enabling the air inlet portion 311 and the air outlet portion 314 to communicate, and achieving the deflation effect.

The one-way air outlet valve can be arranged at the air outlet.

In conclusion, the cushioning airbag cushion provides buffering to the stressed area by using one side for intake and one side for exhaust, which conforms to the principle of force and can generate buffering through other flows. In addition, it has the effect of reducing people's pressure and provides a new buffering method.

Furthermore, combined with the design of the one-way inlet valve and one-way outlet valve described above, the direction of the air flow can be well controlled, thereby facilitating the realization of a buffering effect.

Compared with the prior art, the cushioning airbag cushion of the present disclosure provides buffering to the stressed area by using one side for intake and one side for exhaust, which conforms to the principle of force and can generate buffering through other flows. In addition, it has the effect of reducing people's pressure and provides a new buffering method.

In addition, a simple one-way air inlet member is used to prevent slow air leakage, thereby effectively preventing the air leakage of the cushion airbag cushion, furthermore, the one-way air inlet valve and the air outlet valve are provided to further effectively prevent air leakage in the air inlet and the air outlet, resulting in a better user experience and convenient operation of the cushioning airbag cushion. Moreover, due to the ability to perform deflation and intake operations at any time, it is portable and convenient, and can be applied to a plurality of different fields.

Figure 14:
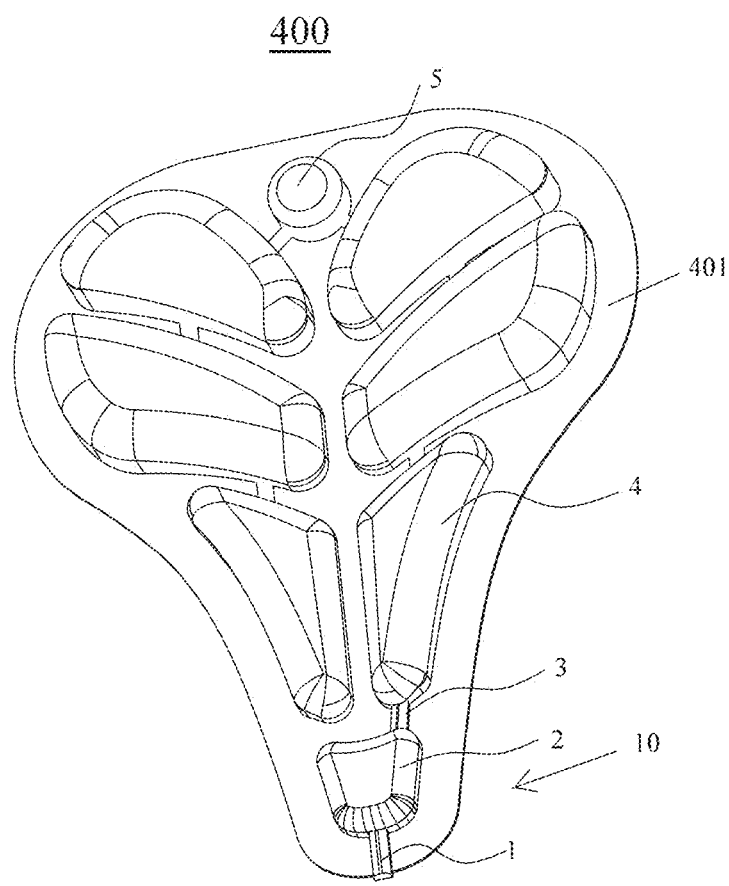
FIG. 14 is a three-dimensional view of a seat cushion according to a second embodiment of the present disclosure.
Figure 15:
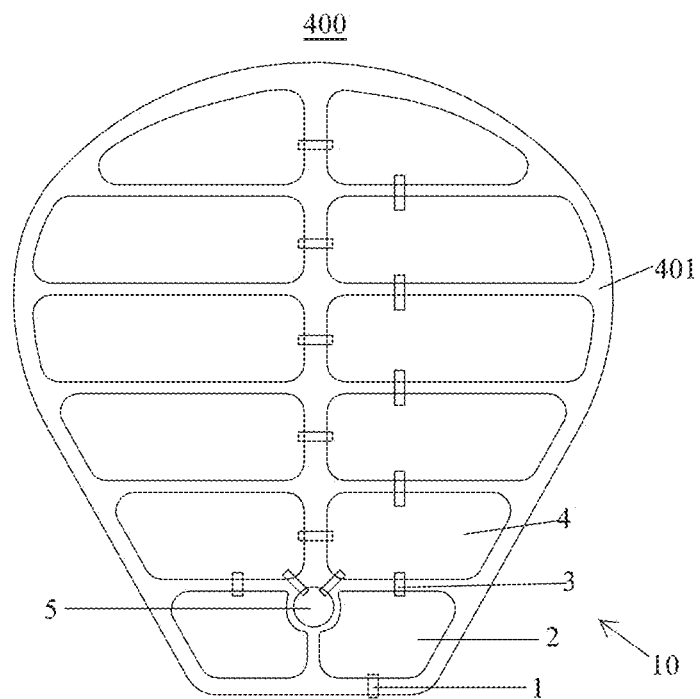
FIG. 15 is a three-dimensional view of another seat cushion of the second embodiment of the present disclosure.
Figure 16:
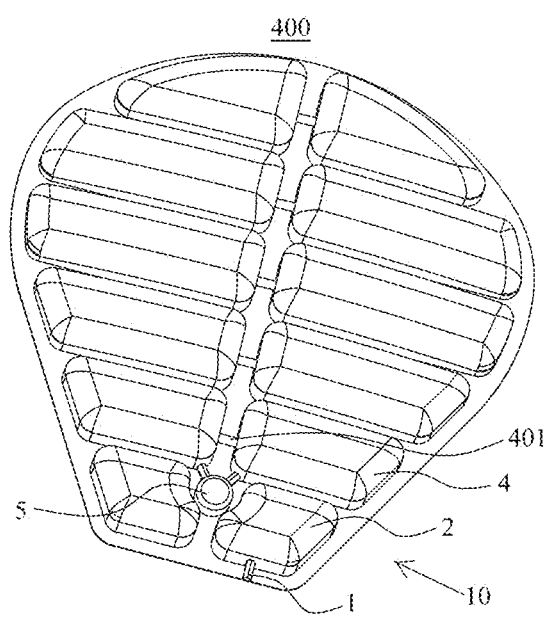
FIG. 16 is a three-dimensional view of another seat cushion of the second embodiment of the present disclosure.

FIGS. 14-16 are schematic views of a seat cushion 400 according to a second embodiment of the present disclosure. In the second embodiment, the cushioning airbag device is applied to a seat cushion 400 of motorcycles, bicycles, etc. in an airbag cushion product. The seat cushion 400 includes a cushion airbag device 100 and a main body 401. The structure of the cushion airbag device 100 of the seat cushion 400 of the second embodiment is roughly the same as that of the cushion airbag device 100 of the seat cushion 200 of the first embodiment, and therefore the description of the same configuration is omitted.

The main body 401 includes a plurality of airbags and a plurality of air channels. The first airbag 2 of the cushioning airbag device 100 is located at the beginning of the seat cushion 400 of motorcycles, bicycles, etc., one side of the first airbag 2 is provided with an first air inlet 1, and another side of the first airbag 2 is connected to the second airbag 4. In this embodiment, the main body 401 only includes one first airbag 2 for air intake, the second airbag 4 is in air communication with the first airbag 2 by the first airway 3, so that the second airbag 4 is connected in series with the first airbag 2. The second airbag 4 is in air communication with the plurality of airbags of the main body 401 through a plurality of air channels of the main body 401. In order to provide sufficient space for the arrangement of the second airbag 4, in the seat cushion 400 of the motorcycles, bicycles, etc., the air outlet 5 is arranged at any part of the seat cushion 400 of the motorcycle or bicycle, and the air outlet 5 is in air communication with the second airbag 4 by the seat main body 401 so as to discharge air.

The elastic member is only arranged in the first airbag 2, and the elastic member supports the first airbag 2 to pop up such that the airbag is filled with gas.

The first airbag 2 is connected in series with the second airbag 4, such that the gas flow is in one direction, so as to achieve the buffering effect.

Figure 17:
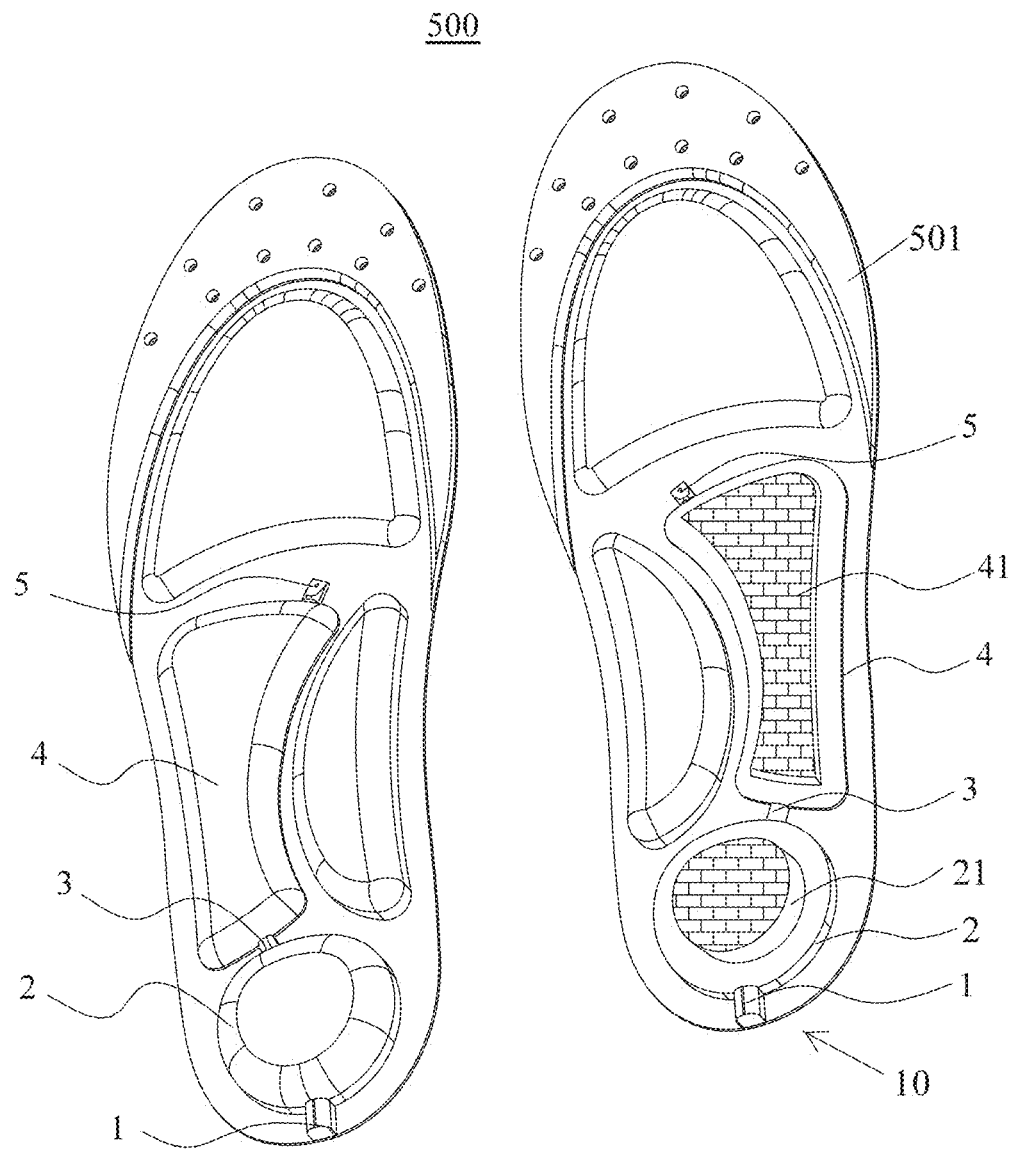
FIG. 17 is a three-dimensional view of a shoe insole according to a third embodiment of the present disclosure.

FIG. 17 is a schematic diagram of a shoe insole 500 according to a third embodiment of the present disclosure. In the third embodiment, the cushioning airbag device is applied to the shoe insole 500 in the airbag cushion product. The cushion airbag device 100 of the third embodiment is roughly the same as that of the cushion airbag device 100 of the seat cushion 200 of the first embodiment. The cushion airbag device 100 of the shoe insole 500 of the third embodiment differs from the cushion airbag device 100 of the first embodiment in that, the cushion airbag device 100 of the shoe insole 500 of the third embodiment does not include the air release valve 30.

The first airbag 2 of the cushioning airbag device 100 is arranged on a corner of the shoe insole 500. One side of the first airbag 2 is provided with a first air inlet 1, and another of the first airbag 2 is connected to the second airbag 4. In this embodiment, the shoe insole 500 only includes one first airbag 2 for air intake. The second airbag 4 is connected in series with the first airbag 2 through the first airway 3. The first airbag 2 and the second airbag 4 can be large or small, and also have different shapes, and are sized and shaped according to practical requirements.

The first airbag 2 is provided with an elastic member 21 therein. The second airbag 4 may also be provided with a second elastic member 41. The elastic member 21 and the second elastic member 41 support the first airbag 2 and the second airbag 4 to pop up, such that the airbag is filled with gas. In other embodiment, only the first airbag 2 is provided with the elastic member, and the second airbag 4 is not provided with the second elastic member 41, that is the elastic member can be provided according to practical requirements.

In order to achieve better exhaust, the air outlet 5 is provided in the middle of one side of the shoe insole 500, and the air outlet 5 is connected to the second airbag 4 for exhaust.

Generally, the elastic member is only disposed on the first airbag 2, and the elastic member supports the first airbag 2 to pop up such that the first airbag 2 is filled with gas.

Figure 18:
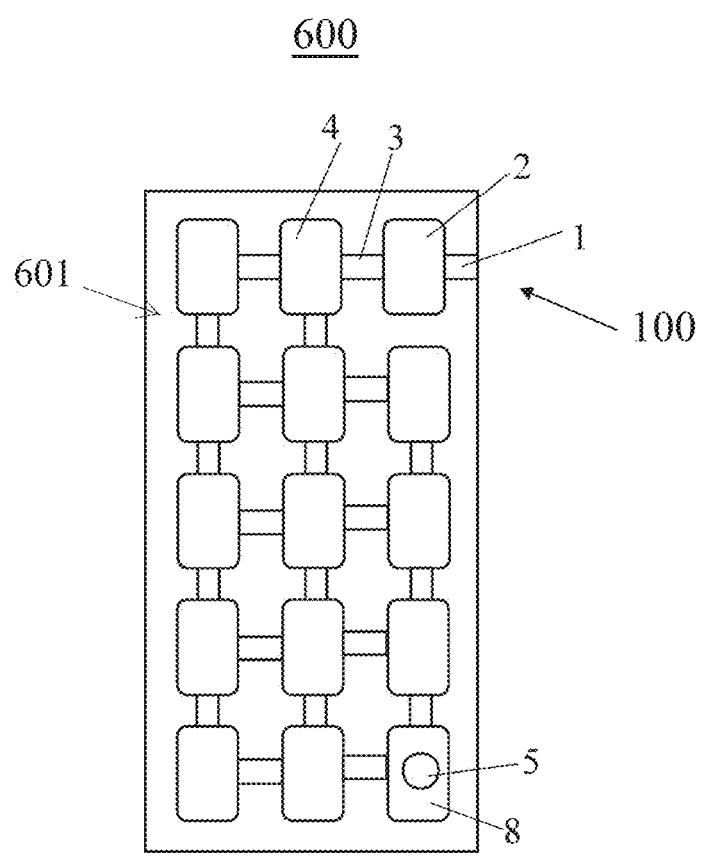
FIG. 18 is a three-dimensional view of a shoulder harness according to a fourth embodiment of the present disclosure.

FIG. 18 is a fourth embodiment of the present disclosure. in the fourth embodiment, the cushion airbag device 100 is applied to a shoulder harness 600 in the buffer airbag device.

The shoulder harness 600 includes the cushion airbag device 100 and a shoulder harness body 601. The structure of the cushion airbag device 100 of the shoulder harness 600 of the fourth embodiment is roughly the same as that of the cushion airbag device 100 of the seat cushion 200 of the first embodiment. The shoulder harness body 601 includes a plurality of airbags and a plurality of air channels. The cushion airbag device 100 includes the first airbag 2, the second airbag 4, the first airway 3 and the third airbag 8. One side of the first airbag 2 is provided with a first air inlet 1, and another of the first airbag 2 is connected to the second airbag 4 by the first airway 3. The second airbag 4 and the third airbag 8 are in air communication with a plurality of airbags of the shoulder harness body 601 through a plurality of air channels of the shoulder harness body 601, and the third airbag 8 is located at the tail end of the shoulder harness body 601. An elastic member is provided in the first airbag 2, and a one-way air inlet member is arranged between the first airbag 2, the second airbag 4 and the first airway 3. The third airbag 8 includes an air outlet 5, and the air outlet 5 is provided with an air outlet valve.

In the above embodiments, there may be one or more than two airbags. For example, as shown in FIGS. 1-2 and FIGS. 14-18, the first airbag 2 and the second airbag 4 are a combination of a plurality of airbags. However, the first airbag 2 and the second airbag 4 may be combined into one airbag. As a basic component unit of the cushion airbag cushion, there may be one airbag or several airbags, when there are several airbags, the several airbags are connected together by an air airway, but the air inlet is provided on the first airbag, at least the first airbag is provided with an elastic member, and an air outlet is arranged at any airbag so as to satisfy the requirements of inflation and deflation, and to meet people's needs for length, width, shape, and other aspects.

In an actual airbag cushion, the airbag cushion is provided with an airbag with a single-sided protrusion or a double-sided protrusion. Therefore, an elastic member must be provided in the first airbag to help the airbag cushion bulge. Therefore, the pressure is for exhalation, the lifting is for inhalation, two valves are provided on the periphery of the airbag cushion, and one is an air inlet valve, and one is an air outlet valve.

When the airbag is manufactured, plane pressing may be used, and the materials used for airbags with single-sided protrusions and double-sided protrusions are mainly TPU, elastic cloth, TPR adhesive, thermal sol, or PVC. For example, TPU is coated with TPR adhesive and adhered to elastic fabrics, it will be used as the material for the upper cushion surface. Another method is that TPU is coated with TPR adhesive, adhered to elastic cloth, and then coated with TPR adhesive again, and then adhered to another TPU layer.

If no airbags are needed on the lower cushion surface, use TPU or TPU coated with TPR adhesive to adhere to non-elastic materials or fabrics.

The advantage of using TPU and fabrics is that its elasticity. An airbag cushion is inflated to a saturation by air inflation of an air pump, and the airbag cushion will not increase or rise all the time, and will be pulled by fabrics. However, if the airbag cushion only has TPU without fabric, the airbag cushion will become larger and larger, causing fatigue or even bursting.

In summary, the present disclosure can be applied to all cushioning airbag cushions, such as shoulder straps type shoulder cushions, home seat cushions, waist cushions, mattresses, medical type mattresses, automobile safety belts, shoe insoles, motorcycle cushions, bicycle cushions, mouse cushions, hemorrhoid cushions, knee cushions, helmet cushions, bullet-proof vest cushions, etc.

The foregoing descriptions are merely exemplary embodiments of the present disclosure, but are not intended to limit the scope of protection of the present disclosure. Any person skilled in the art can make equivalent replacements or modifications according to the technical solutions of the present disclosure and the inventive concept thereof within the technical scope disclosed in the present disclosure, which shall belong to the scope of protection of the present disclosure.

The invention claimed is:

1. A cushioning airbag device comprising:
   a first airbag comprising an air inlet in communication with outside;
   a second airbag;
   a first airway in air communication with the first airbag and the second airbag; and
   a one-way air inlet valve arranged at the air inlet, wherein the one-way air inlet valve comprises:
   an air inlet member in air communication with the first airbag;
   an jacking member clamped into the air inlet member and in air communication with the air outlet-inlet member; and
   a block movably arranged between the air inlet member and the jacking member,
   wherein the one-way air inlet performs one-way intake by a movement of the block,
   the air inlet member comprises a cavity, a side of the air inlet member is provided with a mounting opening, and another side of the air inlet member is provided with an air outlet hole in air communication with the first airbag, the cavity and the mounting opening,
   the jacking member is inserted into the cavity of the air inlet member via the mounting opening, and the jacking member comprises an opening arranged at a front end of the jacking member and in air communication with the air outlet hole, and a through hole defined at the bottom of the opening and configured for air intake, and when the cushioning airbag device is pressed, the block blocks the opening under the action of air pressure.

2. The cushioning airbag device according to claim 1, wherein the cushioning airbag device further comprises a one-way air outlet valve and a third airbag adjacent to and communicating with the first airbag, the third airbag is provided with an air outlet, and the one-way air outlet valve is mounted on the air outlet of the third airbag and configured for discharging air inside the third airbag to environment external to the cushioning airbag device, and preventing external air from entering the third airbag through the one-way gas outlet valve.

3. The cushioning airbag device according to claim 2, wherein the one-way air outlet valve further comprises an air inlet terminal, a spring and a plug, the air inlet terminal is arranged the air outlet and is in air communication with the third airbag, the spring is sleeved on the plug, and the plug is movably inserted into the air inlet terminal.

4. The cushioning airbag device according to claim 3, wherein the one-way air outlet valve comprises a seal ring, and the seal ring is sleeved on the plug and located between the gas inlet terminal and the plug, the one-way air outlet valve is configured for preventing external air from flowing into the third airbag and prevent air inside the third airbag from flowing out.

5. The cushioning airbag device according to claim 1, wherein the cushioning airbag device further comprises an elastic member disposed in the first airbag, and the elastic member configured for supporting the first airbag to bulge so as to intake air into the second airbag by the first airway and the first airbag,
when the first airbag is pressed, the elastic member in the first airbag is pressed, the first airbag is in a pressed state, and under the action of a pressure differential, gas inside the first airbag flows into the second airbag through the first airway, thereby inflating the second airbag; and
when the first airbag is released, the elastic member supports the first airbag to return to a reset state, and under the action of the pressure differential, the air inlet inhale air external to the cushioning airbag device, thereby supplementing air into the first airbag.

6. The cushioning airbag device according to claim 5, wherein the elastic member is any one of sponge, plastic colloid, spring, rubber and silica gel.

7. The cushioning airbag device according to claim 1, wherein the block is a ball, and a diameter of a bottom of the opening is smaller than a diameter of the block.

8. The cushioning airbag device according to claim 1, wherein the air inlet member comprises an inner edge protruding inward, an outer peripheral surface of the jacking member is provided with an outer edge configured for clamping the inner edge.

9. The cushioning airbag device according to claim 1, wherein an inner wall of the mounting opening comprises a guiding slope configured for guiding a portion of the jacking member to slide into the cavity of the air inlet member.

10. The cushioning airbag device according to claim 1, wherein the cushioning airbag device further comprises a one-way air inlet component arranged at the first airway and configured to enable air inside the first airbag to be unidirectionally intake into the second airbag,
one end of the one-way air inlet component extends to the second airbag.

11. A one-way air inlet valve configured for a cushioning airbag device, the cushioning airbag device comprising a plurality of airbags, the one-way air inlet valve being provided in at least one airbag of the plurality of airbags,
the one-way air inlet valve comprising:
an air inlet member in air communication with the at least one airbag;
an jacking member engaged with the air inlet member and in air communication with the air inlet member; and
a ball rotatably arranged between the air inlet member and the jacking member, the ball comprising an engagement surface,
wherein the one-way air inlet performs one-way intake by a movement of the ball, and when the ball moves to one of the air inlet member and the jacking member, the engagement surface of the ball abuts against an inner surface of the air inlet member or an inner surface of the jacking member.

12. The one-way air inlet valve according to claim 11, wherein the air inlet member comprises a cavity, a side wall of the cavity is provided with a mounting opening, and another side wall of the cavity is provided with an air outlet hole,
the jacking member is inserted into the cavity of the air inlet member via the mounting opening, a front end of the jacking member comprises an opening, the opening is in air communication with the air outlet hole and is configured for accommodating the ball, and when the cushioning airbag device is pressed, the ball blocks the opening under the action of air pressure.

13. The one-way air inlet valve according to claim 12, wherein a diameter of a bottom of the opening is smaller than a diameter of the ball.

14. The one-way air inlet valve according to claim 12, wherein the air inlet member comprises an inner edge protruding inwardly, an outer peripheral surface of the jacking member is provided with an outer edge configured for clamping the inner edge.

15. The one-way air inlet valve according to claim 12, wherein an inner wall of the mounting opening comprises a guiding slope configured for guiding a portion of the jacking member to slide into the cavity of the air inlet member.

16. A one-way air inlet valve configured for a cushioning airbag device, the cushioning airbag device comprising a plurality of airbags, the one-way air inlet valve being provided in at least one airbag of the plurality of airbags,
the one-way air inlet valve comprising:
an air inlet member in air communication with the at least one airbag;
an jacking member engaged with the air inlet member and in air communication with the air inlet member; and
a block movably arranged between the air inlet member and the jacking member, the block comprising an engagement surface,
wherein the one-way air inlet valve performs one-way intake by a movement of the block, and when the block moves to one of the air inlet member and the jacking member, the engagement surface of the block abuts against an inner surface of the air inlet member or an inner surface of the jacking member,
the air inlet member comprises a cavity, a side of the air inlet member is provided with a mounting opening, and another side of the air inlet member is provided with an air outlet hole in air communication with the at least one airbag, the cavity and the mounting opening,
the jacking member is inserted into the cavity of the air inlet member via the mounting opening, and the jacking member comprises an opening arranged at a front end of the jacking member and in air communication with the air outlet hole, and a through hole defined at the bottom of the opening and configured for air intake, and when the cushioning airbag device is pressed, the block blocks the opening under the action of air pressure.

17. The one-way air inlet valve according to claim 16, wherein the block is a ball, and a diameter of a bottom of the opening is smaller than a diameter of the block.

18. The one-way air inlet valve according to claim 16, wherein the air inlet member comprises an inner edge protruding inwardly, an outer peripheral surface of the jacking member is provided with an outer edge configured for clamping the inner edge.

19. The one-way air inlet valve according to claim 16, wherein an inner wall of the mounting opening comprises a guiding slope configured for guiding a portion of the jacking member to slide into the cavity of the air inlet member.

* * * * *